United States Patent
Mynar et al.

(10) Patent No.: US 10,923,964 B2
(45) Date of Patent: Feb. 16, 2021

(54) POWER TRANSMITTER UNIT

(71) Applicant: NXP USA, INC., Austin, TX (US)

(72) Inventors: Zbynek Mynar, Roznov pod Radhostem (CZ); Jozef Cicka, Cadca (SK); Vojtěch Musil, Kuncice pod Ondrejnikem (CZ)

(73) Assignee: NXP USA, Inc., Austin, TX (US)

( * ) Notice: Subject to any disclaimer, the term of this patent is extended or adjusted under 35 U.S.C. 154(b) by 36 days.

(21) Appl. No.: 16/273,720

(22) Filed: Feb. 12, 2019

(65) Prior Publication Data
US 2019/0312466 A1  Oct. 10, 2019

(30) Foreign Application Priority Data
Apr. 9, 2018 (EP) .................................... 18166402

(51) Int. Cl.
*H02J 50/60* (2016.01)
*H02J 50/12* (2016.01)
*H02J 7/02* (2016.01)

(52) U.S. Cl.
CPC .............. *H02J 50/60* (2016.02); *H02J 50/12* (2016.02); *H02J 7/025* (2013.01)

(58) Field of Classification Search
CPC . H02J 50/60; H02J 50/12; H02J 7/025; G01R 1/28; G01V 3/00
See application file for complete search history.

(56) References Cited

U.S. PATENT DOCUMENTS

| 6,591,682 B1 * | 7/2003 | Lysen | ................... G01H 1/003 |
| | | | 702/56 |
| 8,947,045 B2 * | 2/2015 | Jung | ....................... H02J 50/90 |
| | | | 320/108 |
| 9,423,439 B2 * | 8/2016 | Jung | ....................... H02J 50/12 |
| 9,623,763 B2 | 4/2017 | Wechlin | |
| 9,729,204 B2 * | 8/2017 | Kozakai | .................. H02J 50/90 |
| 9,825,486 B2 | 11/2017 | Liu et al. | |

(Continued)

FOREIGN PATENT DOCUMENTS

| EP | 3293849 A1 | 3/2018 |
| WO | WO-2013/164831 A1 | 11/2013 |
| WO | PCT-2016/159788 A1 | 10/2016 |

*Primary Examiner* — Pinping Sun

(57) ABSTRACT

A power-transmitter-unit includes a power-transmitting-coil for wirelessly providing power to a power-receiver-unit, and a resonant-capacitor connected to the power-transmitting-coil, such that together they define an LC circuit. The LC circuit includes a first-end and a second-end. A controller defines a foreign-object-detection-mode of operation, wherein, in the foreign-object-detection-mode of operation, the first-end of the LC circuit is connected to the second-end of the LC circuit such that the LC circuit is short-circuited and defines a closed-LC-circuit, and the controller is configured to receive a coil-current-signal that is representative of the current through the closed-LC-circuit. The controller is further configured to process the coil-current-signal that was received during the foreign-object-detection-mode of operation, in order to determine the resistance of the closed-LC-circuit, and provide an indication that a foreign object has been detected if the determined resistance of the closed-LC-circuit is greater than a resistance-threshold value.

14 Claims, 6 Drawing Sheets

(56) References Cited

U.S. PATENT DOCUMENTS

| | | | |
|---|---|---|---|
| 2009/0216472 A1* | 8/2009 | Zima | H02H 6/00 |
| | | | 702/65 |
| 2012/0326521 A1* | 12/2012 | Bauer | B60L 1/00 |
| | | | 307/104 |
| 2014/0225452 A1* | 8/2014 | Kozaki | H02J 50/60 |
| | | | 307/104 |
| 2015/0028689 A1* | 1/2015 | Arisawa | H02J 50/60 |
| | | | 307/104 |
| 2015/0035558 A1* | 2/2015 | Tawaragi | H02J 50/12 |
| | | | 324/764.01 |
| 2015/0054355 A1* | 2/2015 | Ben-Shalom | H02J 7/025 |
| | | | 307/104 |
| 2015/0285926 A1 | 10/2015 | Oettinger | |
| 2015/0311725 A1* | 10/2015 | Yamamoto | G01V 3/101 |
| | | | 307/104 |
| 2016/0099578 A1* | 4/2016 | Hwang | H02J 50/40 |
| | | | 307/104 |
| 2016/0139618 A1 | 5/2016 | Tsai et al. | |
| 2016/0187519 A1* | 6/2016 | Widmer | B60L 53/124 |
| | | | 324/222 |
| 2016/0285278 A1* | 9/2016 | Mehas | H02J 50/12 |
| 2016/0349782 A1 | 12/2016 | Tsai et al. | |
| 2016/0372749 A1* | 12/2016 | Iida | C01G 53/50 |
| 2017/0004686 A1* | 1/2017 | Zacchio | G08B 29/046 |
| 2017/0085135 A1 | 3/2017 | Stevens et al. | |
| 2017/0117755 A1 | 4/2017 | Muratov et al. | |
| 2018/0026482 A1* | 1/2018 | Asano | H02J 50/12 |
| | | | 307/104 |
| 2018/0212476 A1* | 7/2018 | Nguyen | H02J 7/025 |
| 2018/0219430 A1* | 8/2018 | Russell | H02J 50/60 |
| 2019/0074722 A1* | 3/2019 | Shahsavari | H02J 50/40 |
| 2019/0272943 A1* | 9/2019 | Leem | H02J 7/02 |
| 2019/0310388 A1* | 10/2019 | Park | H02J 50/12 |
| 2019/0326782 A1* | 10/2019 | Graham | H02J 50/60 |

* cited by examiner

POWER TRANSMITTER UNIT

CROSS-REFERENCE TO RELATED APPLICATIONS

This application claims priority under 35 U.S.C. § 119 to European Patent application No. 18166402.0, filed on Apr. 9, 2018, the contents of which are incorporated by reference herein.

The present disclosure relates to power transmitter units, and in particular to power transmitter units that wirelessly provide power to a power receiver unit.

According to a first aspect of the present disclosure there is provided a power-transmitter-unit comprising:
- a power-transmitting-coil for wirelessly providing power to a power-receiver-unit, and a resonant-capacitor connected to the power-transmitting-coil, such that together they define an LC circuit, wherein the LC circuit comprises a first-end and a second-end;
- a controller configured to define a foreign-object-detection-mode of operation, wherein:
    - in the foreign-object-detection-mode of operation:
        - the first-end of the LC circuit is connected to the second-end of the LC circuit such that the LC circuit is short-circuited and defines a closed-LC-circuit; and
        - the controller is configured to receive a coil-current-signal that is representative of the current through the closed-LC-circuit;
    - wherein the controller is further configured to:
        - process the coil-current-signal that was received during the foreign-object-detection-mode of operation, in order to determine the resistance of the closed-LC-circuit; and
        - provide an indication that a foreign object has been detected if the determined resistance of the closed-LC-circuit is greater than a resistance-threshold value.

Performing foreign object detection based on a determined resistance value can advantageously provide an accurate detection; for instance, a more accurate detection than can be achieved by processing a quality factor (Q) for the closed-LC-circuit.

In one or more embodiments, the power-transmitter-unit further comprises power-stage for selectively providing power to the LC circuit. The controller may be further configured to define a power-transmission-mode of operation. In the power-transmission-mode of operation: the power-stage may be configured to provide a potential difference across the first-end and the second-end of the LC circuit.

In one or more embodiments, the power-transmitter-unit further comprises an ADC configured to provide the coil-current-signal as a sequence of digital samples that are representative of the current through the closed-LC-circuit.

In one or more embodiments, the ADC is configured to provide one or more digital samples for each period of the current through the closed-LC-circuit.

In one or more embodiments, the ADC is configured to apply a sampling rate that satisfies the Nyquist sampling rate for the power-transmitter-unit.

In one or more embodiments, the ADC is configured to provide digital samples that have a constant time period.

In one or more embodiments, the controller is configured to apply an auto-regressive modelling algorithm to the coil-current-signal in order to determine the resistance of the closed-LC-circuit.

In one or more embodiments, the controller is configured to apply a least squares method to the coil-current-signal in order to determine the resistance of the closed-LC-circuit.

In one or more embodiments, the controller is configured to disable the power-transmission-mode of operation if the determined resistance of the closed-LC-circuit is greater than a resistance-threshold value.

In one or more embodiments, the controller is configured to periodically switch between the power-transmission-mode of operation and the foreign-object-detection-mode of operation.

In one or more embodiments, the power-transmitter-unit comprises a plurality of power-transmitting-coils for wirelessly providing power to a power-receiver-unit, wherein each power-transmitting-coil is connected to a resonant-capacitor to define an LC circuit, and wherein each LC circuit comprises a first-end and a second-end. In a power-transmission-mode of operation: the power-stage may be configured to provide a potential difference across the respective first-ends and second-end of the plurality of LC circuits. In the foreign-object-detection-mode of operation: the power-stage may be configured to not provide a potential difference across the respective first-ends and second-end of the plurality of LC circuits; and for each of the plurality of LC circuits in turn: the first-end of the LC circuit may be connected to the second-end of the LC circuit such that the LC circuit is short-circuited and defines a closed-LC-circuit; and the controller may be configured to receive a coil-current-signal that is representative of the current through the closed-LC-circuit. The controller may be further configured to: process the coil-current-signals in order to determine the resistance of the closed-LC-circuits; and provide an indication that a foreign object has been detected if the determined resistance of any of the closed-LC-circuits is greater than an associated resistance-threshold value.

In one or more embodiments, a single capacitor may provide the functionality of the resonant-capacitor of a plurality, and optionally all, of the LC circuits.

According to a further aspect, there is provided a method of detecting a foreign object, the method comprising:
- connecting a first-end of an LC circuit to a second-end of the LC circuit such that the LC circuit is short-circuited and defines a closed-LC-circuit; and
- receiving a coil-current-signal that is representative of the current through the closed-LC-circuit;
- processing the coil-current-signal in order to determine the resistance of the closed-LC-circuit; and
- providing an indication that a foreign object has been detected if the determined resistance of the closed-LC-circuit is greater than a resistance-threshold value.

There may be provided an electronic device comprising any power-transmitter-unit, apparatus, controller or system disclosed herein, or configured to perform any method disclosed herein.

There may be provided a computer program configured to perform any method disclosed herein, or configured to provide the functionality of any power-transmitter-unit, apparatus, controller or system disclosed herein.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which.

Wireless charging systems can include a power transmitter unit (PTU) and a power receiver unit (PRU). Such systems use an electromagnetic field to transfer energy from a power transmitter coil to a power receiver coil. If there are electrically conductive (foreign) objects in the electromagnetic field between the PTU and PRU coils, then eddy currents are induced in those objects. This can cause excessive heating of the object, and can cause damage to health or property.

One or more of the examples disclosed below can detect electrically conductive foreign objects (FO) that are located in the vicinity of the PTU and PRU during power transfer. Optionally, power transfer can be terminated in response to the detection of a foreign object in order to improve the safety of the system.

Figure 1:
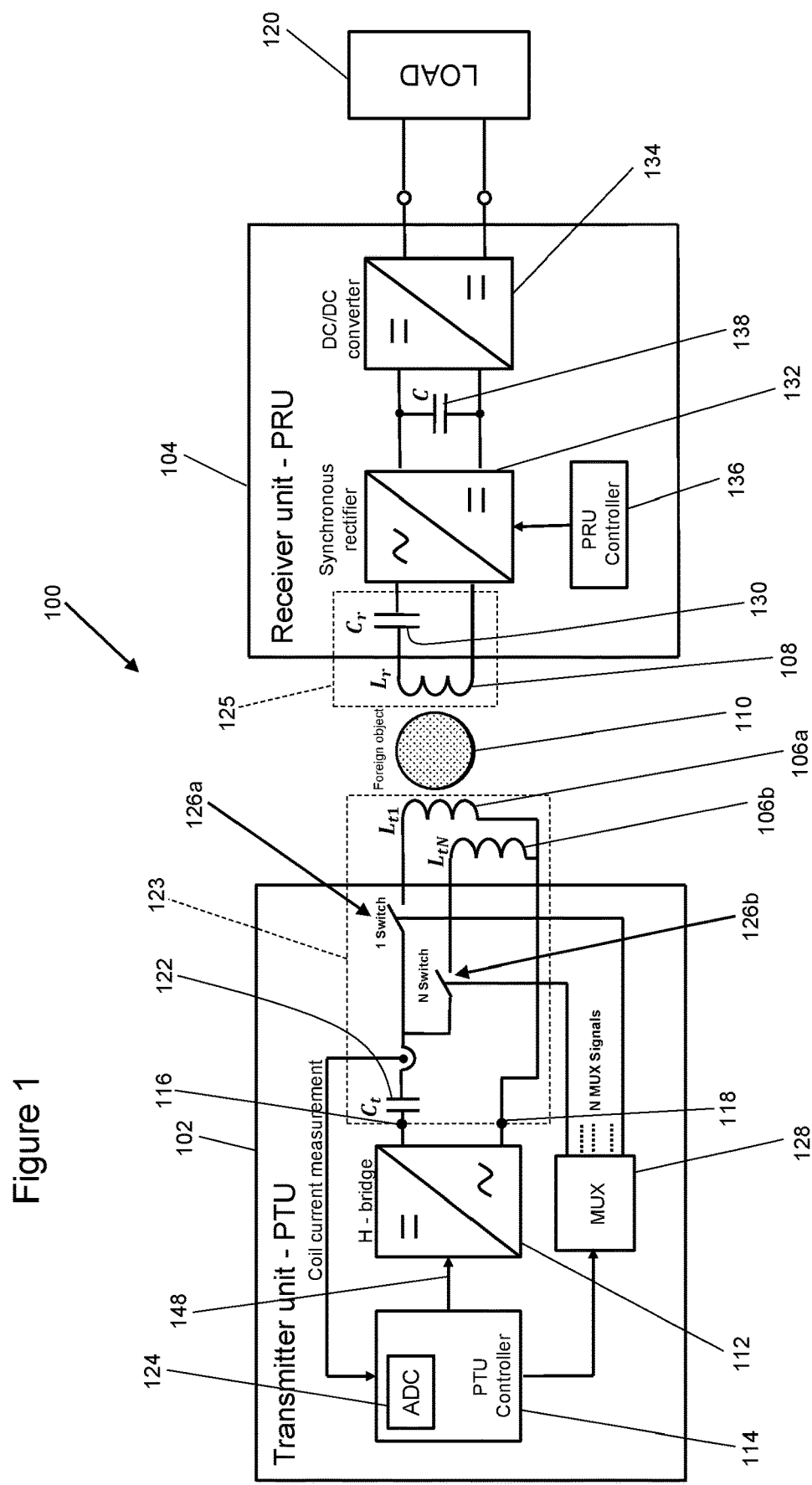
FIG. 1 shows a simplified block diagram of a wireless charging system.

FIG. 1 shows a simplified block diagram of a wireless charging system 100. The wireless charging system 100 includes a power-transmitter-unit 102 and a power-receiver-unit 104.

The power-transmitter-unit 102 includes at least one power-transmitting-coil $L_t$ 106 for wirelessly providing power to the power-receiver-unit 104. In FIG. 1, the power-transmitter-unit 102 includes a plurality of power-transmitting-coils 106a, 106b, and is a multi-coil system. The immediately following description relates to use of a single power-transmitting-coil 106. Additional description is provided later in this document for a system with a plurality of power-transmitting-coils 106.

The power-receiver-unit 104 has a power-receiving-coil 108 for receiving power from the power-transmitting-coil 106.

The power-transmitter-unit 102 also includes a power-stage 112 for selectively providing power to the power-transmitting-coil 106. In this example the power-stage 112 is provided as an H-bridge inverter, which provides appropriate voltages across the power-transmitting-coil 106 such that it generates a high-frequency power electromagnetic field. Further details of the power-stage 112 are provided below with reference to FIG. 2.

A controller 114 is associated with the power-transmitter-unit 102, and can control the wireless power transfer process including its initiation.

A resonant-capacitor $C_t$ 122 is connected in series with the power-transmitting-coil 106, such that together they define an LC circuit 123. (In other examples, not shown, the LC circuit may include additional components, and the resonant-capacitor $C_t$ 122 can be connected in parallel with the power-transmitting-coil 106.) The power-stage 112 can alternately provide a first-potential-difference and a second-potential-difference across a first-end 116 and a second-end 118 of the LC circuit 123 in order to generate current through the power-transmitting-coil 106. During power transfer, in one example the first-potential-difference can be the opposite polarity to the second-potential-difference. In some examples, phase shift control can be used such that first-potential-difference can be out of phase with respect to the second-potential-difference by any amount.

The power-receiver-unit 104 includes a resonant-capacitor $C_r$ 130 that is in series with the power-receiving-coil 108. In this way, the resonant-capacitor $C_r$ 130 and the power-receiving-coil 108 define an LC resonant circuit 125 in the power-receiver-unit 104, in a similar way to the LC circuit 123 in the power-transmitter-unit 102. The power-receiver-unit 104 in this example also includes a synchronous rectifier 132 that rectifies the AC voltage that is provided by the power-receiving-coil 108, and a DC/DC converter 134 that converts the rectified voltage provided by the synchronous rectifier 132 into a suitable voltage for its load 120.

The power-receiver-unit 104 further includes a receiver-controller 136 for controlling the synchronous rectifier 132, and a DC-bus-capacitor C 138 connected between the input terminals of the DC/DC converter 134. The DC-bus-capacitor C 138 is used to store charge that is provided by the synchronous rectifier 132. In this way, the voltage at the input terminals of the DC/DC converter 134 can be maintained at a sufficiently high level if there is a temporary interruption to the voltage induced in the power-receiving-coil 108.

Also shown in FIG. 1 is a foreign object 110, which is in the vicinity of the power-transmitting-coil 106. As discussed above, this can lead to the undesired heating of the foreign object 110.

The controller 114 is configured to define a power-transmission-mode of operation and a foreign-object-detection-mode of operation of the power-transmitter-unit 102. In this example, the controller 114 provides control-signalling 148 to the power-stage 112 to set the mode of operation.

In the power-transmission-mode of operation, the power-stage 112 is configured to provide a potential difference across the first-end 116 and the second-end 118 of the LC circuit 123—for example to alternately provide a first-potential-difference and a second-potential-difference, as described above. This can be considered as normal power transfer, and can result in the power-transmitter-unit 102 wirelessly providing power to the power-receiver-unit 104. In turn, the power-receiver-unit 104 can provide power to its load 120. For instance, the power-receiver-unit 104 can be part of a notebook computer, and the load 120 can be the notebooks power management system. In this way, the power-transmitter-unit 102 can be used to wirelessly charge the battery of the notebook.

In the foreign-object-detection-mode of operation, the power-transmitter-unit 102 can determine whether or not a foreign object 110 is receiving power from a power-transmitting-coil 106, and therefore whether or not a conductive foreign object 110 is in the vicinity of a power-transmitting-coil 106.

When the controller 114 puts the power-transmitter-unit 102 into the foreign-object-detection-mode of operation, it connects the first-end 116 of the LC circuit 123 formed by the power-transmitting-coil 106 and the resonant-capacitor Ct 122 to the second-end 118 of the LC circuit 123 such that the LC circuit 123 is short-circuited. This can be referred to as a closed-LC-circuit. That is, the first-end 116 and the second-end 118 246b of the power-transmitting LC circuit 123 can be put at the same potential. In this example, as will described with reference to FIG. 2, the power-stage 112 includes one or more switches that are operable to selectively short circuit the power-transmitting LC circuit 123. In other examples, the functionality to short-circuit the power-transmitting LC circuit 123 may be provided by a separate component.

At least in the foreign-object-detection-mode of operation, the controller 114 receives a coil-current-signal that is representative of the current through the short-circuited power-transmitting LC circuit 123.

In this example, the controller 114 includes an ADC (analogue-to-digital converter) 124 that provides the coil-current-signal as a sequence of digital samples that are representative of the current through the closed LC circuit 123. The ADC 124 can provide a plurality of digital samples for each period of the alternating current through the closed LC circuit 123. Advantageously, the ADC can provide digital samples with constant time period $T_s$ (equi-temporal), which need not be aligned with the period of the alternating current through the closed LC circuit 123. The sampling period $T_s$ can be determined by the microcontroller (MCU) of the power-transmitter-unit 102. These samples can be considered as asynchronous to the coil current because the free-running LC circuit 123 can oscillate at its natural frequency that is defined given by Ct and Lt. In this way no additional hardware is required to ensure that samples are taken at specific phases of the alternating current through the closed LC circuit 123, for example to ensure that the alternating current through the closed LC circuit 123 is sampled at it's peaks to obtain the maximum values of the signal.

The controller 114 can then process the coil-current-signal 124 in order to determine the resistance of the closed LC circuit 123. Then, the controller 114 can provide an indication that a foreign object 110 has been detected if the determined resistance of the closed LC circuit 123 is greater than a resistance-threshold value. As will be discussed below, performing foreign object detection based on a determined resistance value can advantageously provide an accurate detection; for instance, a more accurate detection than can be achieved by processing a quality factor (Q) for the closed LC circuit 123.

The controller 114 can periodically switch between the power-transmission-mode of operation and the foreign-object-detection-mode of operation. In some examples, the foreign-object-detection-mode of operation can have a duration that is less than 100 microseconds, or less than 50 microseconds. Also, the controller 114 can activate the foreign-object-detection-mode of operation (and deactivate the power-transmission-mode of operation) only a few times per second, depending upon the application, so that any negative impact on power transfer efficiency is minimal or non-existent. For instance, the controller can activate the foreign-object-detection-mode of operation less than or equal to 1, 2, 5, or 10 times per second.

In some examples, the controller 114 can initiate a foreign-object-detection-mode of operation based on one or more operating parameters of the wireless charging system 100; in particular of the power-transmitter-unit 102. For instance, a resonant frequency tracking algorithm can used to determine whether the displacement/distance between the power-transmitting-coil 106 and the power-receiving-coil 108 has changed. In response, the controller 114 can change the frequency with which the controller initiates a foreign-object-detection-mode of operation 114. Optionally, more frequent foreign object detection can be performed in response to a change in displacement/distance, until the determined displacement/distance settles (for example it's rate of change drops below a threshold value). This can be based on an assumption that it is more likely that a foreign object has come into the vicinity of the power-transmitting-coil 106 if one of the coils has moved.

In further examples, the controller 114 can calculate power losses based on the performance of the power-transmitter-unit 102 and/or the power-receiver-unit 104. The controller 114 can increase the frequency with which the power-transmitter-unit 102 is put into a foreign-object-detection-mode of operation in response to determining a change in the power losses.

Figure 2A:
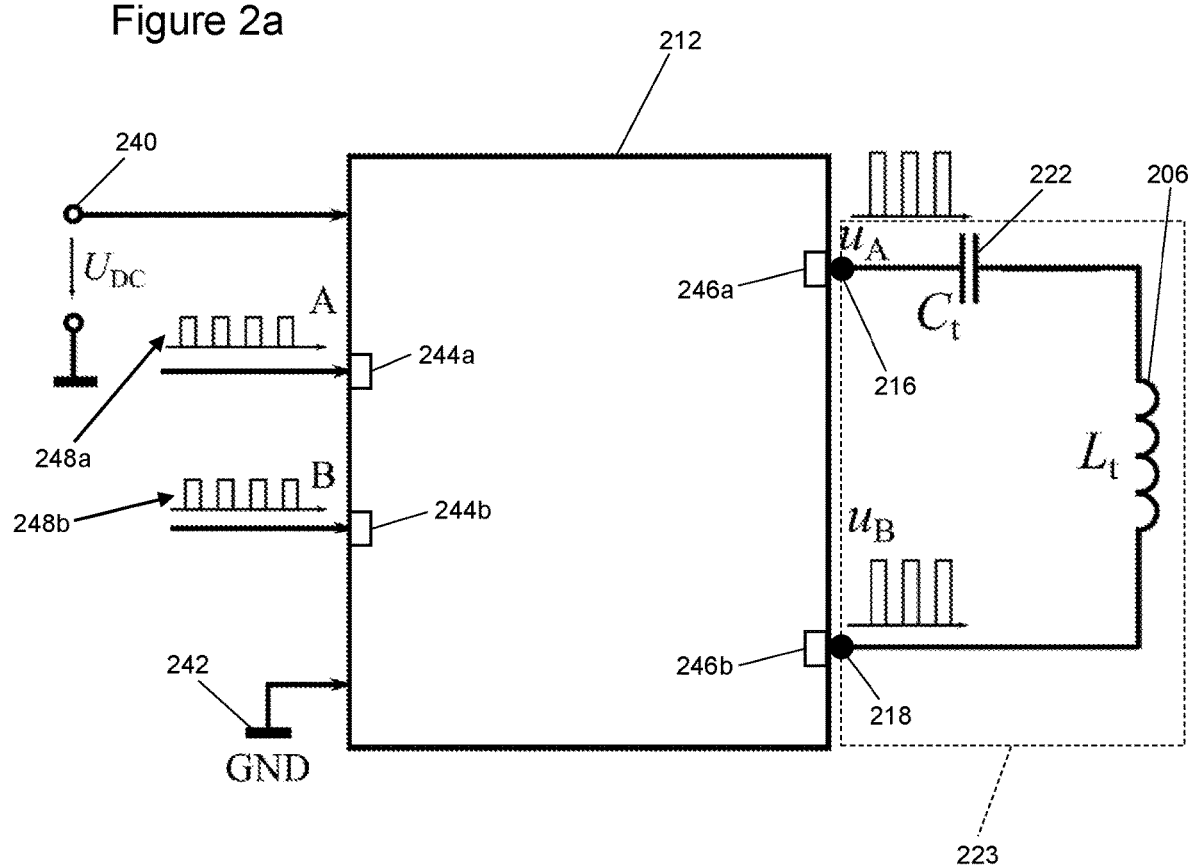
FIGS. 2a and 2b show an example implementation of the power-stage of FIG. 1.
Figure 2B:
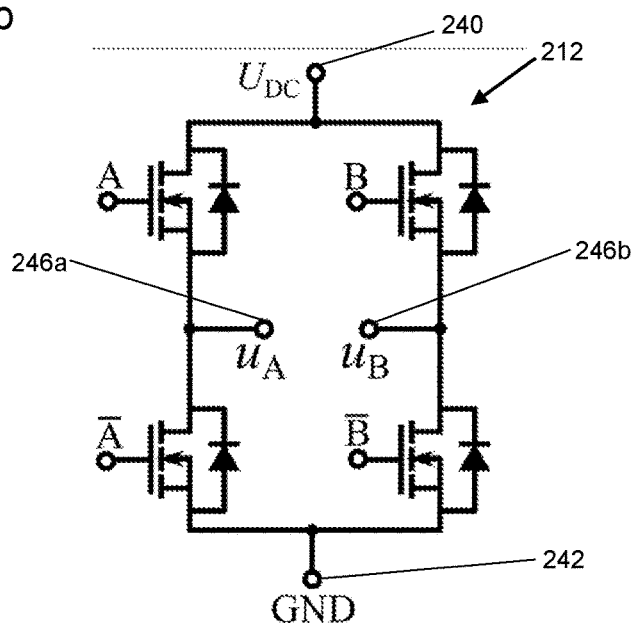

FIGS. 2a and 2b show an example implementation of the power-stage of FIG. 1.

FIG. 2a shows a block diagram of the power-stage 212. The power-stage 212 receives a rail-voltage $U_{DC}$ 240. The power-stage 212 is also connected to a reference-terminal, which in this example is ground 242. The power-stage 212 has a first- and a second-output-terminal ($u_A$, $u_B$) 246a, 246b, which are respectively coupled to the first-end 216 of the LC circuit 223 and the second-end 218 of the LC circuit 223. As discussed with reference to FIG. 1, the LC circuit 223 includes the power-transmitting-coil 206 and the resonant-capacitor Ct 222.

In this example, the power-stage 212 has a first- and a second-input-terminal 244a, 244b, which respectively receive a first- and a second-control-signal (A, B) 248a, 248b from the controller (not shown).

FIG. 2b shows an implementation of the block diagram of FIG. 2a, which in this example is an H-bridge.

During the power-transmission-mode of operation, the control-signals 248 at each of the first- and second-input-terminals 246a, 246b are square waves that alternate between a high-value and zero. Depending on whether phase-shift control or rail voltage $U_{DC}$ control is used, the control-signals 248 can have opposite values to one another. That is, when one of the signals 248 received at an input-terminal 246 is high, the signal 248 received at the other input-terminal 246 is zero, and vice versa. As will be appreciated from FIG. 2b, this generates voltage signals at each of the first- and second-output-terminals ($u_A$, $u_B$) 246a, 246b that are square waves that alternate between: (i) a voltage level that corresponds to the rail-voltage $U_{DC}$ 240; and (ii) ground 242. In this way, the power-stage 212 alternately provides a first-potential-difference and a second-potential-difference across the first-end 216 and the second-end 218 of the power-transmitting LC circuit 223 in order to generate a current through the power-transmitting-coil $L_t$ 206.

Advantageously, when the power-transmitter-unit is in the foreign-object-detection-mode of operation, the power-stage 212 of FIG. 2 can also be used to short-circuit the power-transmitting LC circuit 223. During the foreign-objectdetection-mode of operation, the controller (not shown) provides control-signals 248 at each of the first- and second-input-terminals 246a, 246b of the power-stage 212 that have the same value—that is, the control-signals 248 received at both input-terminals 246a, 246b are either both high or are both zero. As will be appreciated from FIG. 2b, this short-circuits the power-transmitting LC circuit 223 because both ends of the power-transmitting LC circuit 223 are either connected to the rail-voltage $U_{DC}$ 240, or to ground 242.

Figure 3A:
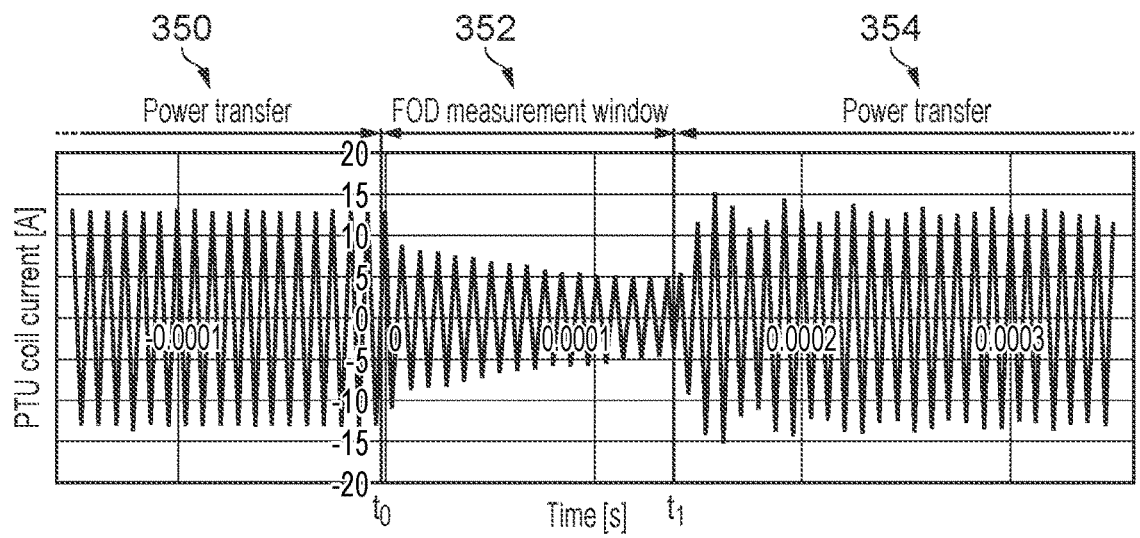
FIGS. 3a, 3b and 3c show plots of signals in the system of FIG. 1.
Figure 3B:
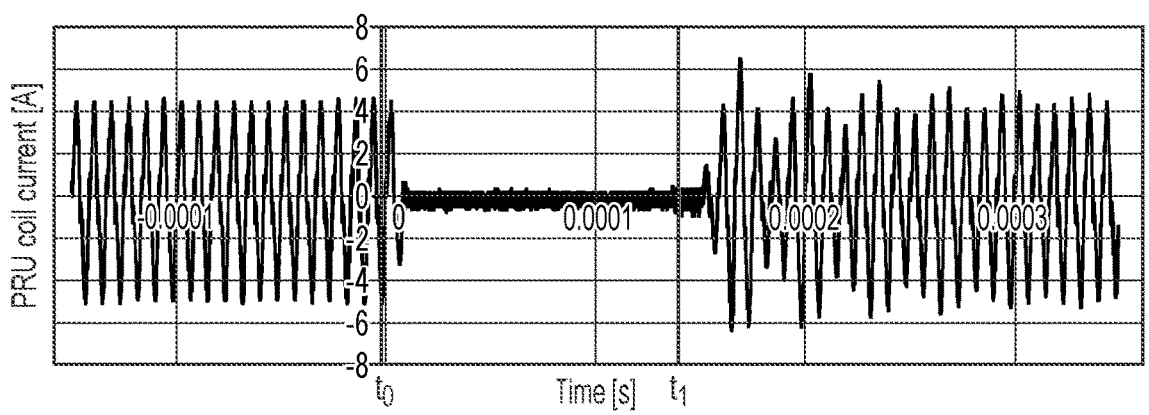
Figure 3C:
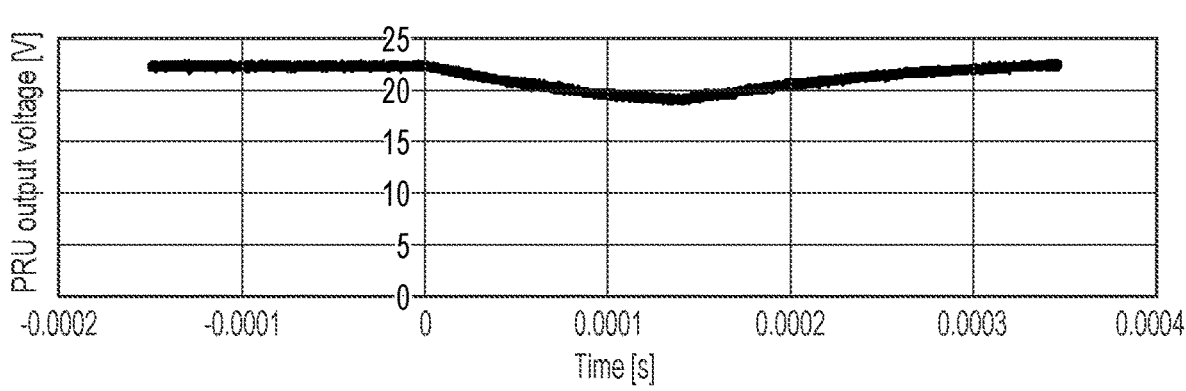

FIGS. 3a, 3b and 3c show plots of signals in the system of FIG. 1 for three time intervals:

a first power-transmission-mode of operation 350,
a foreign-object-detection-mode of operation 352; and
a second power-transmission-mode of operation 354.

FIG. 3a shows the current through the power-transmitting-coil. FIG. 3b shows the current through the power-receiving-coil. FIG. 3c shows the voltage across the DC-bus-capacitor C 138 (that is, the voltage at the input of the DC/DC converter).

As can be seen from FIG. 3c, during the first power-transmission-mode of operation 350, the controller provides control-signals to the power-stage such that it maintains the voltage across the DC-bus-capacitor at a substantially constant value. (Information can be transferred from the power-receiver-unit back to the power-transmitter-unit, in any known way, to provide a control loop that maintains the voltage across the DC-bus-capacitor at the desired value.)

The foreign-object-detection-mode of operation 352 comprises a measurement window $<t_0, t_1>$. As discussed above, the measurement window can be relatively short, for example $t_1 - t_0 \leq 100 \mu s$, and the measurement window $<t_0, t_1>$ may be inserted only a few times per second.

The foreign-object-detection-mode of operation 352 starts at the time $t_0$. For the example of FIG. 2, the foreign-object-detection-mode of operation 352 can be initiated by turning on both of the top MOSFETs of the H-bridge (thus shorting the transmitter resonant circuit to the supply-voltage), or by turning on both of the bottom MOSFETs of the H-bridge (thus shorting the transmitter resonant circuit to ground).

During the foreign-object-detection-mode of operation 352, the controller of the power-transmitter-unit receives a signal representative of the current through the power-transmitting-coil (shown in FIG. 3a) such that it can determine whether or not a foreign object has been detected.

Once sufficient data about the current through the power-transmitting-coil has been provided to the controller, the second power-transmission-mode of operation 354 starts at the time $t_1$ and power transfer is restored. The duration of the foreign-object-detection-mode of operation 352 (t0–t1 as it is shown in FIG. 3) can have a fixed, predetermined value, or can be dynamically set by the controller. (As discussed above, the sampling period $T_s$ applied by the ADC can be constant.) In some examples, the duration of the foreign-object-detection-mode of operation 352 can be set based on an operating parameter of the wireless charging system; in particular of the power-transmitter-unit. In one example, the duration of the foreign-object-detection-mode of operation 352 can be extended by the controller in order to increase the precision with which a foreign object cam be detected. For instance, if a previous foreign-object-detection-mode of operation 352 detects that a foreign object is present, then the controller can perform a further foreign-object-detection-mode of operation 352, with a longer duration, in order to confirm the earlier detection. As another example, the controller can set the duration of the foreign-object-detection-mode of operation 352 based on the level of power that is to be delivered to the load—when the load draws a smaller power, the controller can apply a longer foreign-object-detection-mode of operation 352 without interrupting the supply to the load.

During the second power-transmission-mode of operation 354, the DC-bus-capacitor is charged back to its original value as shown in FIG. 3c. To reduce the likelihood of any significant transients, the power provided to the power-transmitting-coil can be ramped-up over time (such as, over tens of microseconds) in some examples.

A benefit of this method is its independence of the power-receiver-unit. As shown in FIG. 3b, the receiver coil current drops to zero during the foreign-object-detection-mode of operation 352 and the power-receiver-unit therefore represents no significant losses from the point of view of the current through the power-transmitting-coil (as shown in FIG. 3a). Because of this, the parameters of the resonant LC circuit at the power-transmitter-unit (especially the resistance in this example) are not significantly distorted by the power-receiver-unit.

In order for the power-receiver-unit to be able to provide a reliable voltage to its load, the DC-bus capacitor (shown in FIG. 1 with reference 138) should maintain a voltage that is higher than a minimum acceptable DC/DC converter 134 input voltage during the foreign-object-detection-mode of operation 352. To provide this functionality, the size of the capacitance C of the DC-bus capacitor can be selected based on the maximal load power consumption.

Figure 4:
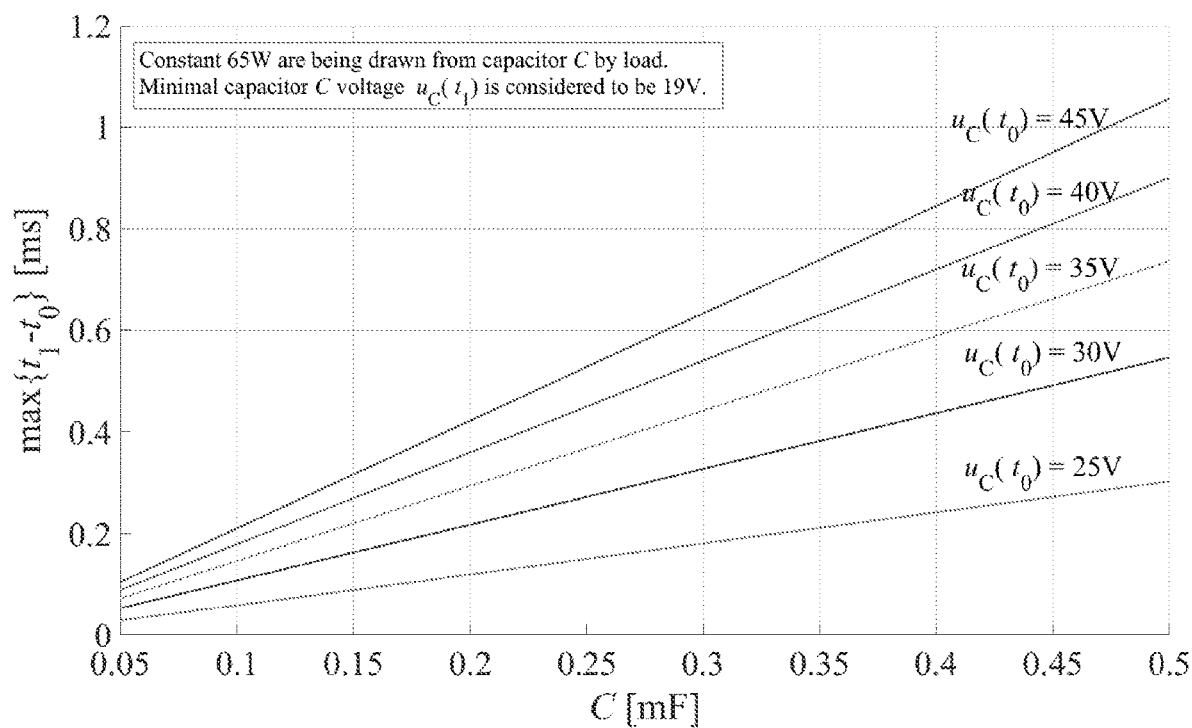
FIG. 4 shows a plot of: (i) capacitance of the DC-bus capacitor, on the horizontal axis, versus (ii) a maximum duration of the foreign-object-detection-mode of operation.

FIG. 4 shows a plot of: (i) a minimum size of the capacitance of the DC-bus capacitor that can be used, on the horizontal axis, versus (ii) a maximum duration of the foreign-object-detection-mode of operation (measurement window) that can be accommodated without the voltage supplied to the load being affected, on the vertical axis. Five different plots are shown for different initial voltage values across the DC-bus capacitor $U_C(t_0)$. Displayed information is based on a system having a load that draws 65 W at 19V.

As can be seen from FIG. 4, the required capacitance C increases with the maximum duration of the foreign-object-detection-mode of operation and decreases with initial capacitor C voltage $U_C(t_0)$. The required capacitance C also increases with maximal power drawn by load.

Returning to FIG. 1, the closed LC circuit 123, which includes the power-transmitting-coil 106 and the resonant-capacitor 122, can be modelled as an RLC circuit that includes:

(a) a resistive component that includes:
  (i) the resistance of the components in the closed loop (the power-transmitting-coil 106, the connecting wires/tracks, and the switch(es) in the power-stage 112); and
  (ii) a resistive effect caused by any conductive foreign object 110 that is in the vicinity of the power-transmitting-coil 106, as will be discussed below;
(b) an inductive component that includes the inductance of the power-transmitting-coil 106, which is affected by the proximity of the power-transmitting-coil 106 to the power-receiving-coil 108 as will be discussed below;
(c) a capacitive component that includes the resonant-capacitor $C_t$ 122.

As discussed above, the controller 114 can process the coil-current-signal 124 to determine the resistance of the closed LC circuit 123. Then, the controller 114 can provide an indication that a foreign object 110 has been detected if the determined resistance of the closed LC circuit 123 is greater than a resistance-threshold value. An example of how this processing can be performed will now be described.

To achieve a short measurement window (for instance 50 us, or below 100 us to enable a reasonably low value for the capacitance of the DC-bus capacitor in the power-receiver-unit), while achieving high resolution in the detection of the foreign object, the closed-LC-circuit can be modelled as an undriven RLC circuit using a discrete second order autoregressive (AR) model:

$$i_{coil}(k) = -a_1 i_{coil}(k-1) - a_2 i_{coil}(k-2), \quad \text{Eq 1:}$$

where:
  $i_{coil}$ is a coil current sample at a discrete time k, and
  $a_1$ and $a_2$ are AR system parameters, which are functions of sampling period, RLC resistance, inductance and known capacitance.

The $R_{est}$ and $L_{est}$ parameters can be obtained from parameter $a_1$ and $a_2$ in more than one way. For example, a general serial RLC circuit can be described using the continuous Laplace transfer function $$F_{RLC}(p) = \frac{I_{coil}(p)}{U_{LC}(p)} = \frac{\frac{1}{L_t} p}{p^2 + \frac{R}{L_t} p + \frac{1}{L_t C_t}}, \quad \text{Eq 2}$$

Where p is Laplace operator, $I_{coil}(p)$ is image of coil current $i_{coil}(t)$, and $U_{LC}(p)$ is image of LC circuit input voltage $u_{LC}(t)$. To obtain discrete representation, the Tustin discretization method can be used with formula $$p = \frac{2}{T_s} \frac{z-1}{z+1}, \quad \text{Eq 3}$$

where, $T_s$ sampling period and z is discrete Z-transformation operator. This leads to discrete transfer function $$F_{RLC}(z) = \frac{I_{coil}(z)}{U_{LC}(z)} = \frac{\frac{2}{L_t T_s} - \frac{2}{L_t T_s} z^{-2}}{\left(\frac{4}{T_s^2} + \frac{2R}{L_t T_s} + \frac{1}{L_t C_t}\right) + \left(\frac{2}{L_t C_t} - \frac{8}{T_s^2}\right) z^{-1} + \left(\frac{4}{T_s^2} - \frac{2R}{L_t T_s} + \frac{1}{L_t C_t}\right) z^{-2}}. \quad \text{Eq 4}$$

Thanks to the fact that the RLC circuit in our case is undriven, the $U_{LC}(z)=0$. This leads to discrete equation $$\left(\frac{4}{T_s^2} + \frac{2R}{L_t T_s} + \frac{1}{L_t C_t}\right) i_{coil}(k) = -\left(\frac{2}{L_t C_t} - \frac{8}{T_s^2}\right) i_{coil}(k-1) - \left(\frac{4}{T_s^2} - \frac{2R}{L_t T_s} + \frac{1}{L_t C_t}\right) i_{coil}(k-2). \quad \text{Eq 5}$$

When comparing the discrete equation Eq 5 and the AR model Eq 1 we can obtain a relationship between parameters of RLC circuit and $a_1$, $a_2$ parameters as follows $$R_{est} = -\frac{T_s}{C_t} \frac{a_2 - 1}{a_2 + a_1 + 1} \quad \text{Eq 6}$$

$$L_{est} = \frac{T_s^2}{4 C_t} \frac{a_2 - a_1 + 1}{a_2 + a_1 + 1} \quad \text{Eq 7}$$

The offline least square method (LSM) can be then used for optimal estimation of parameters $a_1$ and $a_2$ from N collected coil current samples using formula $$\begin{bmatrix} a_1 \\ a_2 \end{bmatrix} = [\Phi^T \Phi]^{-1} \Phi^T Y, \quad \text{Eq 8}$$

where $$\Phi = \begin{bmatrix} i_{coil}(k+1) & i_{coil}(k) \\ \vdots & \vdots \\ i_{coil}(k-1+N) & i_{coil}(k-2+N) \end{bmatrix}, \quad \text{Eq 9}$$

is measurement matrix and $$Y = \begin{bmatrix} i_{coil}(k+2) \\ \vdots \\ i_{coil}(k+N) \end{bmatrix}, \quad \text{Eq 10}$$

is the AR system output vector.

This method is used to estimate the resistance $R_{est}$ and inductance $L_{est}$ of a free-running (undriven) second order RLC circuit according to equations Eq 6 and Eq 7, where capacitance $C_t$ and sampling period $T_s$ are known. Due to the relatively low complexity of the problem (covariance matrix is of only second order and several dozens of samples are needed) low computational burden is achieved.

It will be appreciated that different types of algorithm that utilize equitemporal sampling can be used to determine the resistance of the closed-LC-circuit.

Advantageously, this processing method does not require any sampling synchronisation with the current though the power-transmitting-coil. Therefore, no extra hardware to achieve synchronisation may be required. The ADC 124 should apply a constant sampling rate that satisfies the Nyquist sampling rate for the power-transmitter-unit 102, in order to prevent aliasing effect and thus allow coil current signal reconstruction. In this way, enough samples are available to satisfactorily reconstruct the measured signal. According to Nyquist law $T_s \ll T_0/2$, where $T_0 = 2\pi\sqrt{L_t C_t}$ is the resonant frequency of the LC circuit 123. In some applications, the ADC 124 is configured to acquire at least 8 samples per $T_0$ period.

As discussed above, the closed LC circuit 123 is undriven (free-running with zero voltage at input) when the power-transmitter-unit 102 is in the foreign-object-detection-mode of operation; only one quantity (the current through the closed LC circuit 123) can be measured. The method can also be independent of the coil current amplitude at the start of the foreign-object-detection-mode of operation (time $t_0$ in FIG. 3), provided that significant magnetic saturation is not present.

Figure 5:
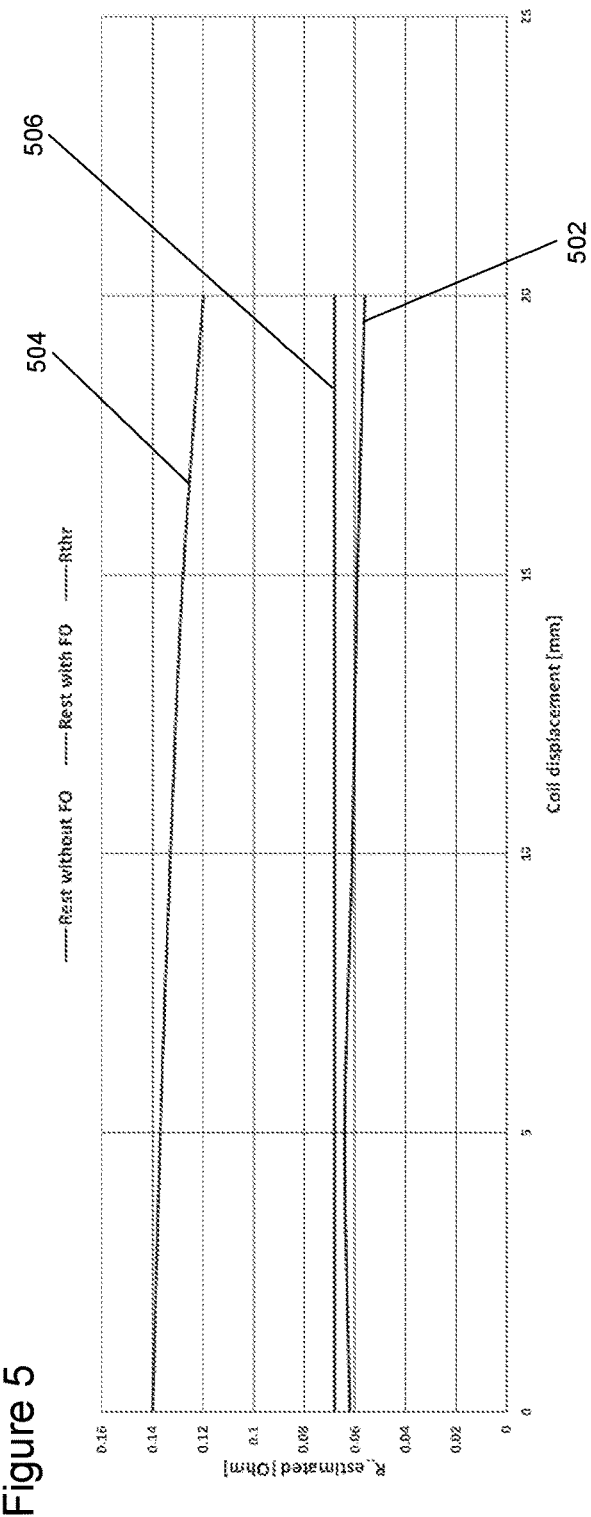
FIG. 5 shows a plot of: (i) $R_{est}$ on the vertical axis, versus (ii) the distance/displacement between the power-transmitting-coil and the power-receiving-coil on the horizontal axis.

The controller 114 can have access to a resistance-threshold value $R_{thr}$, which can be stored in memory. The value for the resistance-threshold value $R_{thr}$ can be determined by modelling the closed LC circuit 123 using coil-current-signalling 124 that is received when a foreign object is known not to be present. The controller 114 can then provide an indication that a foreign object has been detected if the determined resistance $R_{est}$ of the closed-LC-circuit is greater than a resistance-threshold value $R_{thr}$ FIG. 5 shows a plot of: (i) $R_{est}$ (estimated resistance of the closed LC circuit 123 using the method described above) on the vertical axis, versus (ii) the distance/displacement between the power-transmitting-coil and the power-receiving-coil on the horizontal axis. A first plot 502 shows results for a power-transmitting-coil that does not have a foreign object nearby. A second plot 504 shows results for a power-transmitting-coil that does have a foreign object nearby. FIG. 5 shows actual measured data.

The first plot 502 shows that the estimated resistance $R_{est}$ is almost constant for the entire range of coil displacement values, when there is no foreign object present. The two plots 502, 504 show that when there is a foreign object present, the estimated resistance $R_{est}$ is significantly higher than when there is no foreign object present.

Also shown in FIG. 5 is an example constant value for the resistance-threshold value $R_{thr}$ 506. As will be appreciated from the plots of FIG. 5, a foreign object can be detected by comparing the estimated resistance $R_{est}$ with the resistance-threshold value $R_{thr}$ 506.

The second plot 504 shows a small drop of the estimated resistance $R_{est}$ at higher displacements, when a foreign object is present. This is caused by reduced ferrite hysteresis losses in the power-receiving-coil, and a higher amplitude of the current in the power-transmitting-coil, which affects the ADC measurement precision.

Figure 6:
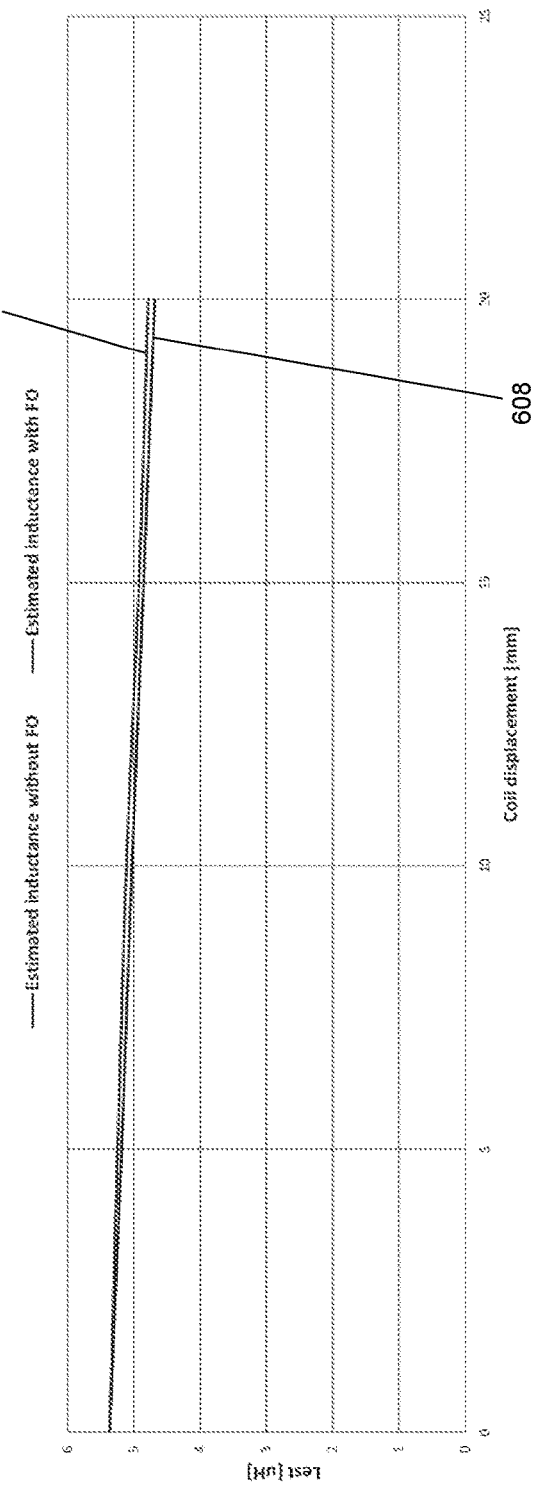
FIG. 6 shows a plot of: (i) $L_{est}$ on the vertical axis, versus (ii) the distance/displacement between the power-transmitting-coil and the power-receiving-coil no the horizontal axis.

FIG. 6 shows a plot of: (i) $L_{est}$ (estimated inductance of the closed LC circuit 123 using the method described above) on the vertical axis, versus (ii) the distance/displacement between the power-transmitting-coil and the power-receiving-coil on the horizontal axis. A first plot 608 shows results for a power-transmitting-coil that does not have a foreign object inserted nearby the power-transmitting coil and the power receiving coil. A second plot 610 shows results for a power-transmitting-coil that does have a foreign object nearby. FIG. 5 shows actual measured data.

FIG. 6 shows a significant change in the estimated inductance $L_{est}$ for different coil displacement values. In FIG. 6, the estimated inductance $L_{est}$ of 85 mm round planar coil reduces from about 5.5 uH to about 4.8 uH, when the coil displacement is increased from 0 to 20 mm.

As discussed above, by using the resistance $R_{est}$ of the closed-loop-circuit rather than quality factor ($Q=\sqrt{L/C}/R$), the controller can more accurately detect a foreign object. For instance, the controller can discriminate between the presence of a foreign object and any changes in the response of the closed-LC-circuit due to the displacement between the power-transmitting-coil and the power-receiving-coil changing. In this way, the variation of estimated inductance for different coil displacement values does not affect the accuracy of the foreign object detection, and the displacement between the coils is less likely to lead to an incorrect determination that a foreign object is, or is not, present.

As shown in FIG. 6, the estimated inductance $L_{est}$ is highest if there is a perfect alignment (zero displacement) between power-transmitting-coil and the power-receiving-coil, and the estimated inductance $L_{est}$ drops as the displacement increases. Since the decay of coil current is a function of $e^{(-R/2L)}$, the decay is relatively fast for inductance values. Since the controller can directly estimate the inductance $L_{est}$ and the resistance $R_{est}$, the controller can evaluate more precisely determine whether or not a foreign object is present.

For example, the power loss due to the presence of the foreign object can be accurately calculated based on the actual coil current. The controller can determine a value for the estimated resistance of the RLC circuit ($R_{tx}$) without a foreign object present (shown with reference 502 in FIG. 5). $R_{tx}$ can represent the resistance of the coil wire and the resistance of MOSFETs in the power-stage, without RX, and can be performed as part of calibration during manufacturing. The controller can also determine a value for the estimated resistance of the RLC circuit ($R_{est}$) with a foreign object present (shown with reference 504 in FIG. 5). The controller can then subtract $R_{tx}$ (502) from $R_{est}$ (504) to determine the resistance of the foreign object. Thus, accurate power loss due to the foreign object can be determined by multiplying the resistance of the foreign object by the square of the current in transmitter coil: the power loss due to the foreign object is $P_{fo}=(R_{est}-R_{tx})I_{coil}^2$.

Returning to FIG. 1, the following description relates to a power-transmitter-unit 102 that has a plurality of power-transmitting-coils 106a, 106b.

The power-stage 112 can selectively provide power to the plurality of power-transmitting-coil 106a, 106b simultaneously in some examples, or to only a subset of the power-transmitting-coils 106a, 106b, in order to provide a desired voltage at the power-receiver-unit 104.

For the multi-coil system, the power-transmitter-unit 102 includes a plurality of coil-switches 126; one for each of the power-transmitting-coils 106. Each coil-switch 126 is connected in series with a power-transmitting-coil 106 such that: when a coil-switch 126 is closed, the associated coil is connected to the power-stage 112; and when a coil-switch 126 is open, the associated coil is disconnected from the power-stage 112. In this example a multiplexer (MUX) 128 provides control signals to operate the coil-switches 126. The multiplexer (MUX) 128 is in turn controlled by the controller 114. In this way, the controller 114 can set which one or more of the power-transmitting-coils 106 can be provided with power from the power-stage 112.

When the power-transmitter-unit 102 is in the power-transmission-mode of operation, in a similar way to that described above, the power-stage 112 is configured to provide a potential difference across the respective first-ends and second-end of the plurality of power-transmitting-coils 106 (either sequentially or simultaneously);

In the foreign-object-detection-mode of operation, the controller 114 controls the power-stage 112 such that each of the power-transmitting-coils 106 that is active during the power-transmission-mode of operation is individually used to detect whether or not a foreign object is inserted between the power-transmitting coil and the power receiving coil, or otherwise in the magnetic field between the power-transmitting-coil 106 and the power-receiving-coil 108. For example, coil-current-signalling may be received for each of the individual power-transmitting-coils 106 in turn during a single foreign-object-detection-mode of operation. Alternatively, the controller 114 may put the power-transmitter-unit 102 back into the power-transmission-mode of operation after receiving coil-current-signalling for one of the power-transmitting-coils 106, and then control the power-stage 112 such that coil-current-signalling is received for a different power-transmitting-coil 106 for the next foreign-object-detection-mode of operation.

Either way, the power-stage 112 is configured to not provide a potential difference across the respective first-ends and second-end of all of the plurality of power-transmitting-coils 106 in the foreign-object-detection-mode of operation. Then, for each of the plurality of power-transmitting-coils in turn: the first-end of the power-transmitting-coil is connected to the second-end of the power-transmitting-coil such that the power-transmitting LC circuit 123 is short-circuited and defines a closed-LC-circuit; and the controller 114 receives a coil-current-signal that is representative of the current through the closed-LC-circuit.

The controller 114 can then process the coil-current-signals in order to determine the resistance of the closed-LC-circuit 123. If the determined resistance of any of the closed-LC-circuits 123 is greater than an associated resistance-threshold value $R_{thr}$, then the controller 114 can provide an indication that a foreign object has been detected. The resistance-threshold value $R_{thr}$ may or may not be the same for each of the plurality of power-transmitting-coils 106.

In this way, the coil-switches 126 of all except one of the power-transmitting-coils 106 can be opened during the foreign-object-detection-mode of operation, such that the other power-transmitting-coils 106 are disconnected from the power-stage 112. Active power-transmitting-coils 106 can be selected in turn so that all power-transmitting-coils 106 that are used during power transfer can be scanned periodically. The multi-coil implementation can also enhance the resolution of the foreign object detection; this is because better coupling can be achieved between foreign objects and smaller power-transmitting-coils.

In some example, the plurality of power-transmitting-coils 106a, 106b that are discussed above may be a subset of power-transmitting-coils in a power-transmitting-coil-array.

Figure 7:
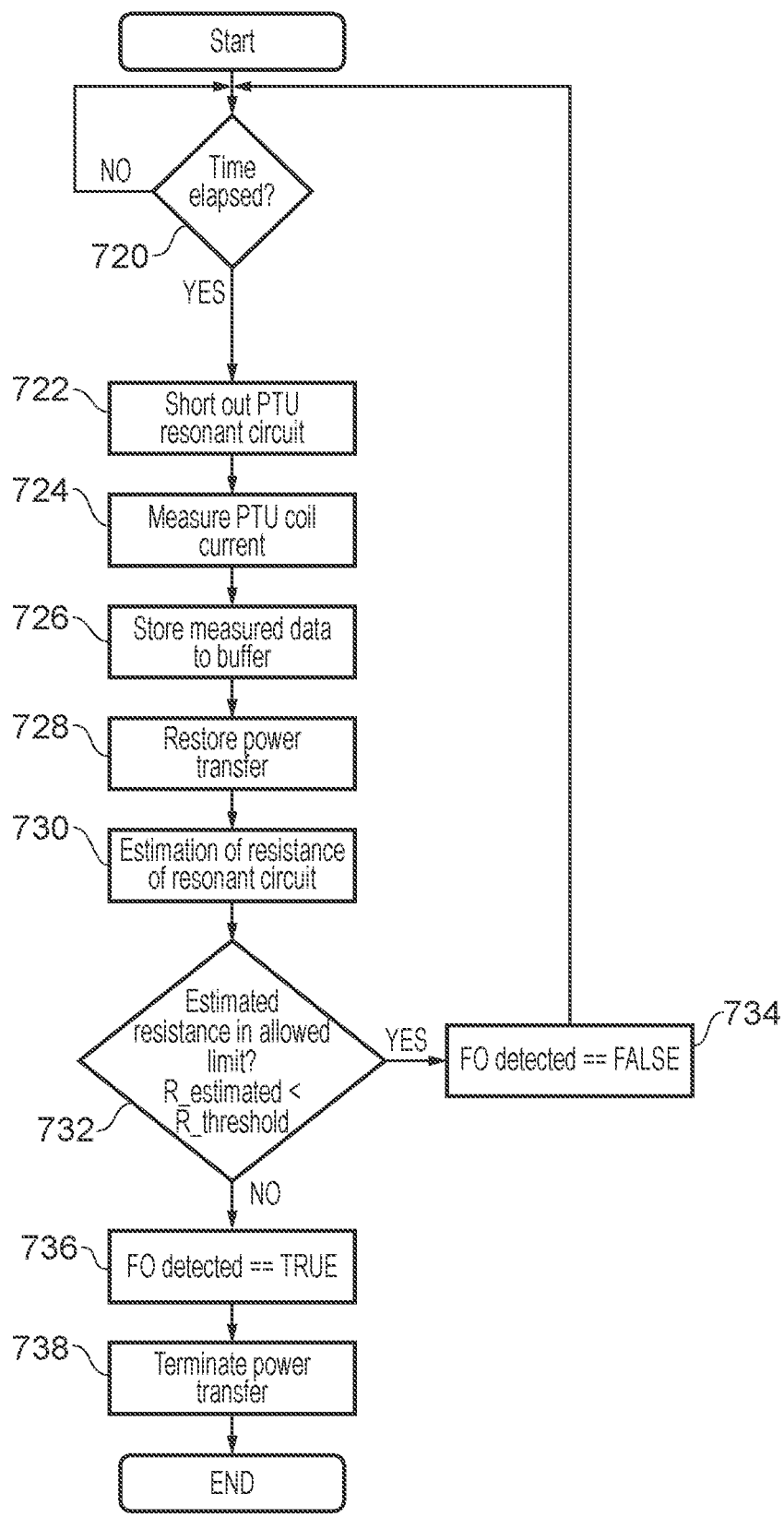
FIG. 7 shows a process flow that illustrates processing that can be performed to determine whether or not a foreign object is in the vicinity of a power-transmitting-coil.

FIG. 7 shows a process flow that illustrates processing that can be performed by a controller to determine whether or not a foreign object is in the vicinity of a power-transmitting-coil. At the start of the process flow, the power-transmitter-unit is in the power-transmission-mode of operation.

At step 720, the process checks whether or not a predetermined time period has elapsed. In this example, the process periodically puts the power-transmitter-unit into a foreign-object-detection-mode of operation. If the predetermined time period has not elapsed, then the power-transmitter-unit continues to operate in the power-transmission-mode of operation. If the predetermined time period has elapsed, then the process moves to step 722 to enter the foreign-object-detection-mode of operation.

At step 722 the process short-circuits the power-transmitting LC circuit 123, for example by connecting both ends of the power-transmitting-coil to a common potential (such as a supply-voltage or ground).

At steps 724 and 726, a coil-current-signal, which is representative of the current through the power-transmitting-coil, is received and is stored into memory. This memory may be referred to as a buffer.

In this example, the processing of the received coil-current-signal does not have to be performed while the power-transmitting LC circuit 123 is short-circuited. Therefore, at step 728, the process restores power transfer by putting the power-transmitter-unit back into the power-transmission-mode of operation.

At step 730 the process estimates the resistance of the closed-LC-circuit, for example using the algorithms discussed above.

At step 732, the process compares the estimated resistance ($R_{est}$) with the resistance-threshold value ($R_{thr}$). If the estimated resistance ($R_{est}$) less than the resistance-threshold value ($R_{thr}$), then the process goes to step 734, a determination is made that a foreign object has not been detected, and the process returns to the start. If the estimated resistance ($R_{est}$) greater than the resistance-threshold value ($R_{thr}$), then the process goes to step 736, and a determination is made that a foreign object has been detected.

In this example, if a foreign object has been detected, then the process moves to step 738 and terminates power transfer by the power-transmitter-unit. It will be appreciated that this functionality can be achieved in a number of ways. For example, the process can disable the power-transmission-mode of operation, optionally until the power-transmitter-unit has been reset or until the process performs a subsequent foreign-object-detection-mode of operation that indicates that the foreign object is no longer present.

It will also be appreciated that the processing of steps 730, 732, 734, 736 and 738 can be performed when the power-transmitter-unit is in the power-transmission-mode of operation (as in this example), or when the power-transmitter-unit is in the foreign-object-detection-mode of operation.

Advantageously, all of the processing illustrated by FIG. 7 can be executed at the power-transmitter-unit. Therefore, the power-receiver-unit does not need any additional hardware, algorithms or communication links with the power-transmitter-unit.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A power-transmitter-unit comprising:
   a power-transmitting-coil for wirelessly providing power to a power-receiver-unit, and a resonant-capacitor connected to the power-transmitting-coil, such that together they define an LC circuit, wherein the LC circuit comprises a first-end and a second-end;
   a controller configured to define a foreign-object-detection-mode of operation, wherein:
      in the foreign-object-detection-mode of operation: the first-end of the LC circuit is connected to the second-end of the LC circuit such that the LC circuit is short-circuited and defines a closed-LC-circuit; and
   the controller is configured to receive a coil-current-signal that is representative of a current through the closed-LC-circuit;
   wherein the controller is further configured to:
      process the coil-current-signal that was received during the foreign-object-detection-mode of operation and a capacitance of the resonant-capacitor, in order to determine a resistance of the closed-LC-circuit; and
      provide an indication that a foreign object has been detected if the determined resistance of the closed-LC-circuit is greater than a resistance-threshold value.

2. The power-transmitter-unit of claim 1, further comprising:
   a power circuit for selectively providing power to the LC circuit; and
   wherein the controller is further configured to define a power-transmission-mode of operation, wherein in the power-transmission-mode of operation:
   the power circuit is configured to provide a potential difference across the first-end and the second-end of the LC circuit.

3. The power-transmitter-unit of claim 1, further comprising an analogue-to-digital (ADC) configured to provide the coil-current-signal as a sequence of digital samples that are representative of the current through the closed-LC-circuit.

4. The power-transmitter-unit of claim 3, wherein the ADC is configured to provide one or more digital samples for each period of the current through the closed-LC-circuit.

5. The power-transmitter-unit of claim 3, wherein the ADC is configured to apply a sampling rate that satisfies a Nyquist sampling rate for the power-transmitter-unit.

6. The power-transmitter-unit of claim 3, wherein the ADC is configured to provide digital samples that have a constant time period.

7. The power-transmitter-unit of claim 1, wherein the controller is configured to apply an auto-regressive modelling algorithm to the coil-current-signal in order to determine the resistance of the closed-LC-circuit.

8. The power-transmitter-unit of claim 1, wherein the controller is configured to apply a least squares method to the coil-current-signal in order to determine the resistance of the closed-LC-circuit.

9. The power-transmitter-unit of claim 1, wherein the controller is configured to disable a power-transmission-mode of operation if the determined resistance of the closed-LC-circuit is greater than the resistance-threshold value.

10. The power-transmitter-unit of claim 1, wherein the controller is configured to periodically switch between a power-transmission-mode of operation and the foreign-object-detection-mode of operation.

11. The power-transmitter-unit of claim 1, wherein:
   the power-transmitter-unit comprises a plurality of power-transmitting-coils for wirelessly providing power to the power-receiver-unit, wherein each power-transmitting-coil is connected to a corresponding resonant-capacitor to define a corresponding LC circuit, and wherein each corresponding LC circuit comprises a first-end and a second-end of a corresponding LC circuit; and
   in a power-transmission-mode of operation:
      the power circuit is configured to provide a potential difference across the respective first-ends and second-end of the plurality of corresponding LC circuits;
   in the foreign-object-detection-mode of operation:
      the power circuit is configured to not provide the potential difference across the respective first-ends and second-end of the plurality of corresponding LC circuits;
      for each of the plurality of corresponding LC circuits in turn:
         the first-end of the corresponding LC circuit is connected to the second-end of the corresponding LC circuit such that the corresponding LC circuit is short-circuited and defines a corresponding closed-LC-circuit; and
         the controller is configured to receive a corresponding coil-current-signal that is representative of a current through the corresponding closed-LC-circuit; and
      wherein the controller is further configured to:
         process the corresponding coil-current-signals in order to determine a resistance of the corresponding closed-LC-circuits; and
         provide the indication that the foreign object has been detected if the determined resistance of any of the corresponding closed-LC-circuits is greater than an associated resistance-threshold value.

12. The power-transmitter-unit of claim 11, wherein a single capacitor provides functionality of the resonant-capacitor of a plurality of the corresponding LC circuits.

13. The power-transmitter-unit of claim 11, wherein a single capacitor provides functionality of the resonant-capacitor of all of the corresponding LC circuits.

14. A method of detecting a foreign object, the method comprising:
   connecting a first-end of an LC circuit that comprises a resonant-capacitor to a second-end of the LC circuit such that the LC circuit is short-circuited and defines a closed-LC-circuit; and
   receiving a coil-current-signal that is representative of a current through the closed-LC-circuit;
   processing the coil-current-signal and a capacitance of the resonant-capacitor in order to determine a resistance of the closed-LC-circuit; and providing an indication that a foreign object has been detected if the determined resistance of the closed-LC-circuit is greater than a resistance-threshold value.

\* \* \* \* \*